US006945369B1

(12) United States Patent
Chen

(10) Patent No.: US 6,945,369 B1
(45) Date of Patent: Sep. 20, 2005

(54) ADJUSTABLE DISK BRAKE ASSEMBLY FOR A BICYCLE

(76) Inventor: Jui-Pin Chen, No. 141-2, Sec. 3, Chungshan Rd., Changhua City, Changhua Hsien (TW)

( * ) Notice: Subject to any disclaimer, the term of this patent is extended or adjusted under 35 U.S.C. 154(b) by 0 days.

(21) Appl. No.: 10/910,319

(22) Filed: Aug. 4, 2004

(51) Int. Cl.$^7$ ................................................ B62L 5/00
(52) U.S. Cl. ................. 188/26; 188/24.11; 188/205 R; 188/24.22
(58) Field of Search .......................... 188/24.11, 24.22, 188/26, 71.1, 17, 205 R, 206 R

(56) References Cited

U.S. PATENT DOCUMENTS

| 6,564,910 B1 * | 5/2003 | Chen et al. ................ 188/26 |
| 2004/0188186 A1 * | 9/2004 | Chen ........................... 188/26 |

* cited by examiner

Primary Examiner—Douglas C. Butler
(74) Attorney, Agent, or Firm—Troxell Law Office, PLLC

(57) ABSTRACT

A brake disk assembly for a bicycle has a body, two brake pads and an adjusting device. The body has a slot, and the brake pads are operationally mounted inside the body. The adjusting device is mounted on the body and has two wings, two adjusting plates, a connecting arm, two bolts and a concave-convex configuration. The wings extend from the body. The adjusting plates are attached respectively to the wings. The connecting arm is mounted between the adjusting plates and has two threaded holes defined respectively in two ends of the connecting arm. The bolts extend respectively through the wings and the adjusting plates and are screwed respectively into the threaded holes in the connecting arm. The concave-convex configuration is mounted between the wings, the adjusting plates and the ends of the connecting arm to make the body adjustably connectable with the connecting arm.

7 Claims, 6 Drawing Sheets

ADJUSTABLE DISK BRAKE ASSEMBLY FOR A BICYCLE

BACKGROUND OF THE INVENTION

1. Field of the Invention

The present invention relates to a disk brake assembly, and more particularly to an adjustable disk brake assembly for a bicycle and that can provide an adjustment capability to align precisely a brake body with a braking disk on the bicycle.

2. Description of Related Art

With reference to FIG. 5, a conventional disk brake assembly for a bicycle is attached to a fork (90) of the bicycle to press against a brake disk (80) to slow or stop the bicycle. The conventional disk brake assembly substantially comprises a body (50), two braking pads and an adjusting device. The body (50) has a slot, and the braking pads are mounted respectively at two sides of the slot and correspond respectively to two sides of the brake disk. The adjusting device is mounted on the body (50), such that the body (50) can be adjusted relative to the fork (90) in position to make the brake pads precisely align with the brake disk (80).

The conventional adjusting device substantially comprises multiple washers (52,54) and two bolts (56). Two stationary arms (51) extend from the body (50) and each has a through hole (512). The washers (52,54) are located respectively at two sides of the stationary arms (51) and align respectively with the through holes (512) in the arms (51). The bolts (56) penetrate respectively through the through holes (512) in the stationary arms (51) and the corresponding washers (52,54) and are screwed with threaded holes (902) in the fork (90). A concave-convex configure is mounted between each pair adjacent washers (52,54), such that the body (51) can be adjusted relative to the fork (90) with the concave-convex configures between the washers (52,54).

However, the conventional adjusting device has a complex structure and is inconvenient to assemble due to the arrangements of the multiple washers (52,54). In addition, this conventional adjusting device can be only applied to a front fork (90) of a bicycle and not to the rear fork of the bicycle, such that the conventional disk brake assembly with the adjusting device is not versatile in use.

With reference to FIG. 6, another conventional disk brake assembly substantially comprises a body (60), two brake pads and an adjusting device. The adjusting device comprises a base (62) formed integrally on the body (60), an adjusting plate (64), two bolts (66) and multiple washers (68,69). The adjusting plate (64) is secured to a fork (92) of a bicycle with the bolts penetrating through the washers (68,69) and the base (62). A curved surface (622,642) is respectively formed on the base (62) and the adjusting plate (64), and a concave-convex configuration is formed on adjacent faces of the washers (68,69). Accordingly, the body (60) of the disk brake assembly can be adjusted relative to the fork (92) to precisely align the brake pads with the brake disk (80).

However, the conventional disk brake also has a complex structure and is inconvenient to assemble. The conventional disk brake can be only applied to a rear fork (92) of a bicycle and cannot be applied to a front fork of the bicycle, such that the conventional disk brake assembly is also inconvenient in use.

To overcome the shortcomings, the present invention tends to provide a disk brake assembly to mitigate or obviate the aforementioned problems.

SUMMARY OF THE INVENTION

The main objective of the invention is to provide a brake disk assembly for a bicycle and that has a simplified structure and an adjustment capability. The brake disk assembly has a body, two brake pads and an adjusting device. The body has a slot, and the brake pads are operationally mounted inside the body and respectively at two sides of the slot. The adjusting device is mounted on the body and has two wings, two adjusting plates, a connecting arm, two bolts and a concave-convex configuration. The wings extend from the body and each has a through hole. The adjusting plates are attached respectively to the wings and each has a through hole aligning with the through hole in a corresponding one of the wings. The connecting arm is mounted between the adjusting plates and has two threaded holes defined respectively in two ends of the connecting arm and two mounting holes defined through the connecting arm. The bolts extend respectively through the through holes in the wings and the corresponding adjusting plates, and are screwed respectively into the threaded holes in the connecting arm. The concave-convex configuration is mounted between the wings, the adjusting plates and the ends of the connecting arm to make the body adjustably connected with the connecting arm.

Other objects, advantages and novel features of the invention will become more apparent from the following detailed description when taken in conjunction with the accompanying drawings.

DETAILED DESCRIPTION OF PREFERRED EMBODIMENT

Figure 1:
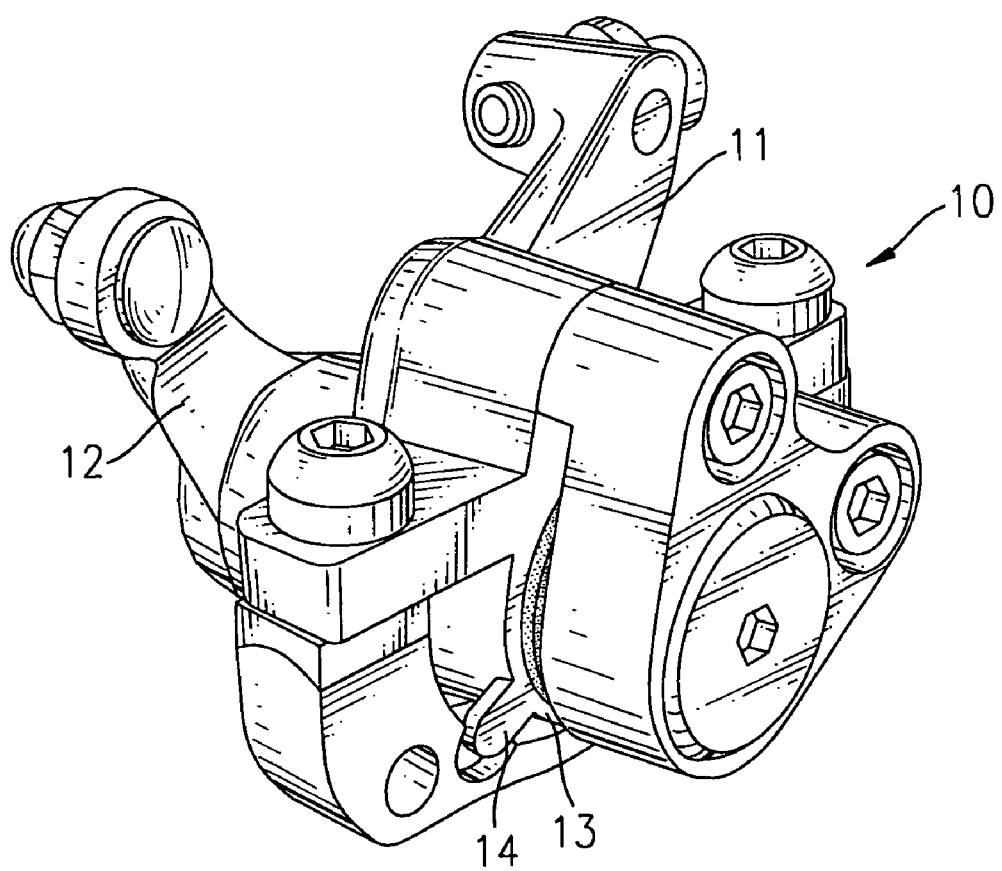
FIG. 1 is a perspective view of a brake disk assembly in accordance with the present invention.
Figure 2:
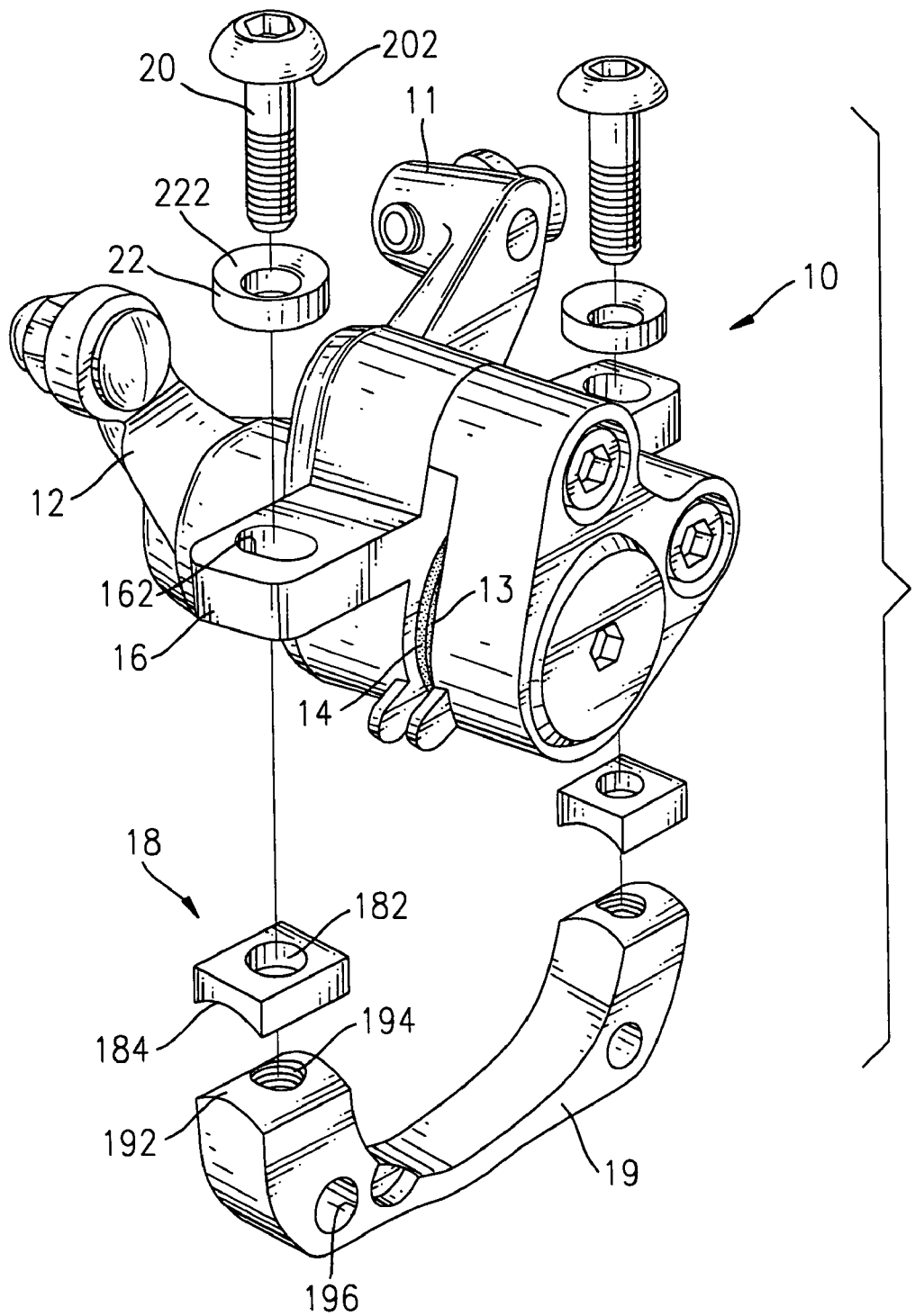
FIG. 2 is an exploded perspective view of the brake disk assembly in FIG. 1.

With reference to FIGS. 1 and 2, a disk brake assembly for a bicycle in accordance with the present invention comprises a body (10), two brake pads (14) and an adjusting device. The body (10) has a slot (13), a stationary arm (11) and a pivotal arm (12). The slot (13) is defined in the body (10). The stationary arm (11) is integrally formed on the body (10), and the pivotal arm (12) is pivotally attached to the body (10) and corresponds to the stationary arm (11). The brake pads (14) are operationally mounted inside the body (10) respectively at two sides of the slot (13) and are operationally connected to the pivotal arm (12). A brake cable penetrates through the stationary arm (11) and is securely connected to the pivotal arm (12) with one end of the brake cable, and the other end of the brake cable is connected to a brake handle. Accordingly, when the bicycle rider pulls the brake handle, the pivotal arm (12) will pivot relative to the body (10) with the transmission of the cable.

The structure and operation of the pivotal arm (12) and brake pads (14) can be same as a conventional one and are not further described.

The adjusting device is mounted on the body (10) and comprises two wings (16), two adjusting plates (18), a connecting arm (19), two bolts (20) and a concave-convex configuration. The wings (16) extend from the body (10) and each has a through hole (162). In an optional embodiment, the through hole (162) in each wing (16) is an elongated through hole. The adjusting plates (18) are attached respectively to the wings (16) and each has a passage (182) aligning with the through hole (162) in a corresponding one of the wings (16).

The connecting arm (19) is mounted between the adjusting plates (18) and has two threaded holes (194) defined respectively in two ends of the connecting arm (19) and two mounting holes (196) defined through the connecting arm (19). In an optional embodiment, with reference to FIG. 3, the mounting holes (196) are through holes for two bolts extending through the mounting holes (196) and being screwed with threaded holes in a fork of the bicycle to securely attach the connecting arm (19) onto the fork. In an alternative embodiment, the mounting holes (196) can be threaded holes for two bolts extending through holes defined in a fork of the bicycle and being screwed with the mounting hole to securely attach the connecting arm (19) to the fork.

The bolts (20) extend respectively through the through holes (162) and passages (182) in the wings (16) and the corresponding adjusting plates (18) and are screwed respectively into the threaded holes (194) in the connecting arm (19). With the bolts (20), the body (10) is connected to the connecting arm (19) and to the fork of the bicycle through the connecting arm (19).

The concave-convex configuration is formed between the wings (16), the adjusting plates (18) and the ends of the connecting arm (19) to make the body (10) adjustably connectable with the connecting arm (19). In a preferred embodiment, the concave-convex configuration comprises two concave surfaces (184) and two convex surfaces (192). The concave surfaces (184) are formed respectively in the adjusting plates (18), and the convex surfaces (192) are formed respectively at the two ends of the connecting arm (19) and correspond respectively to the concave surfaces (184) in the adjusting plates (18). In an alternative embodiment, the concave surfaces are formed on two ends of the connecting arm (19), and the convex surfaces are formed on the adjusting plates (18). In another embodiment, the concave-convex configuration comprises two concave surfaces formed respectively in the wings (16) and two convex surfaces formed respectively at the adjusting plates (18) and corresponding to the concave surfaces in the wings (16). In a further embodiment, the concave-convex configuration comprises two concave surfaces formed respectively in the adjusting plates (18) and two convex surfaces formed respectively at the wings (16).

Figure 3:
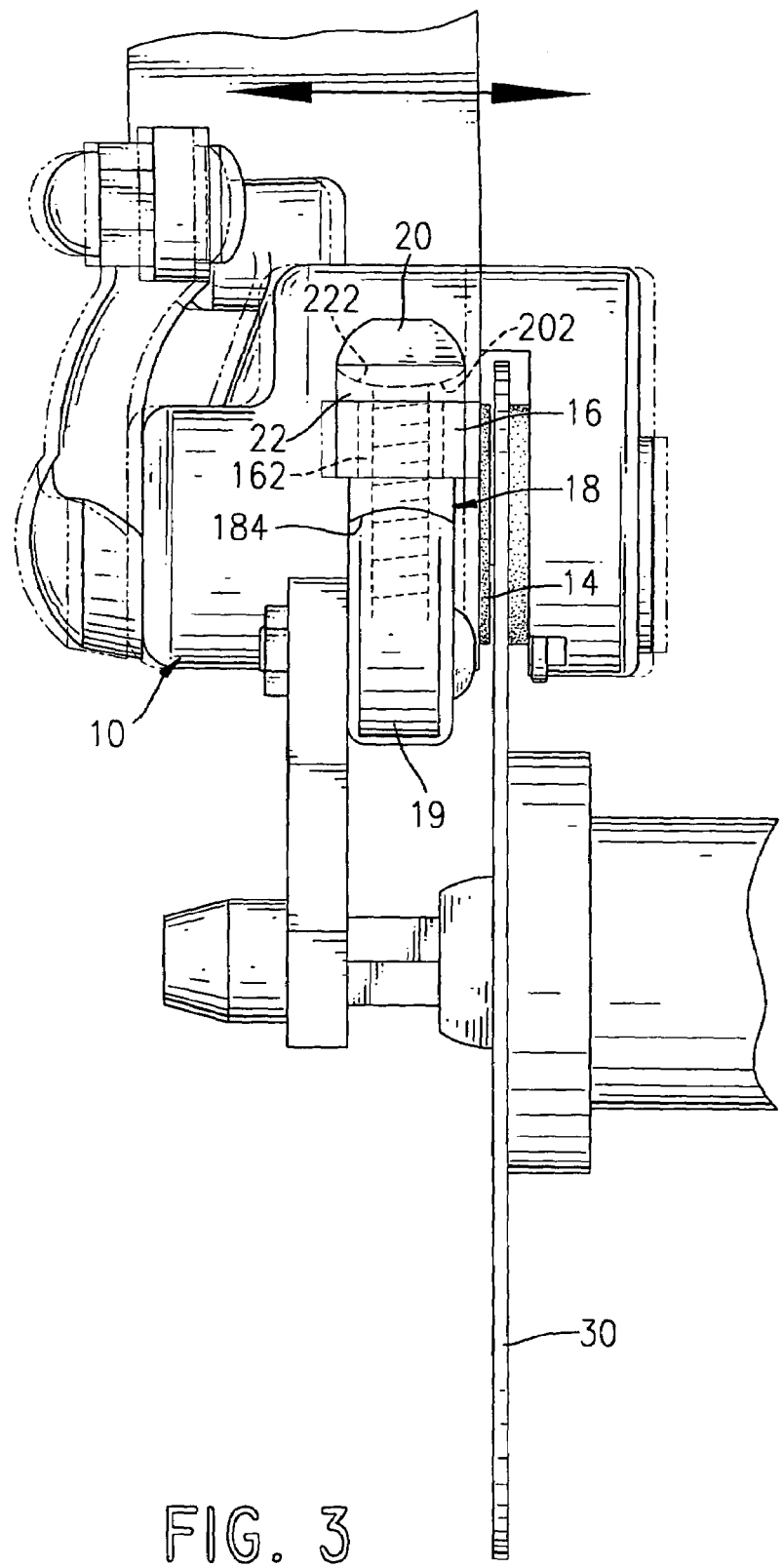
FIG. 3 is an operational side plan view of the brake disk assembly in FIG. 1 showing that the body of the brake disk is adjusted relative to a brake disk in a lateral direction.
Figure 4:
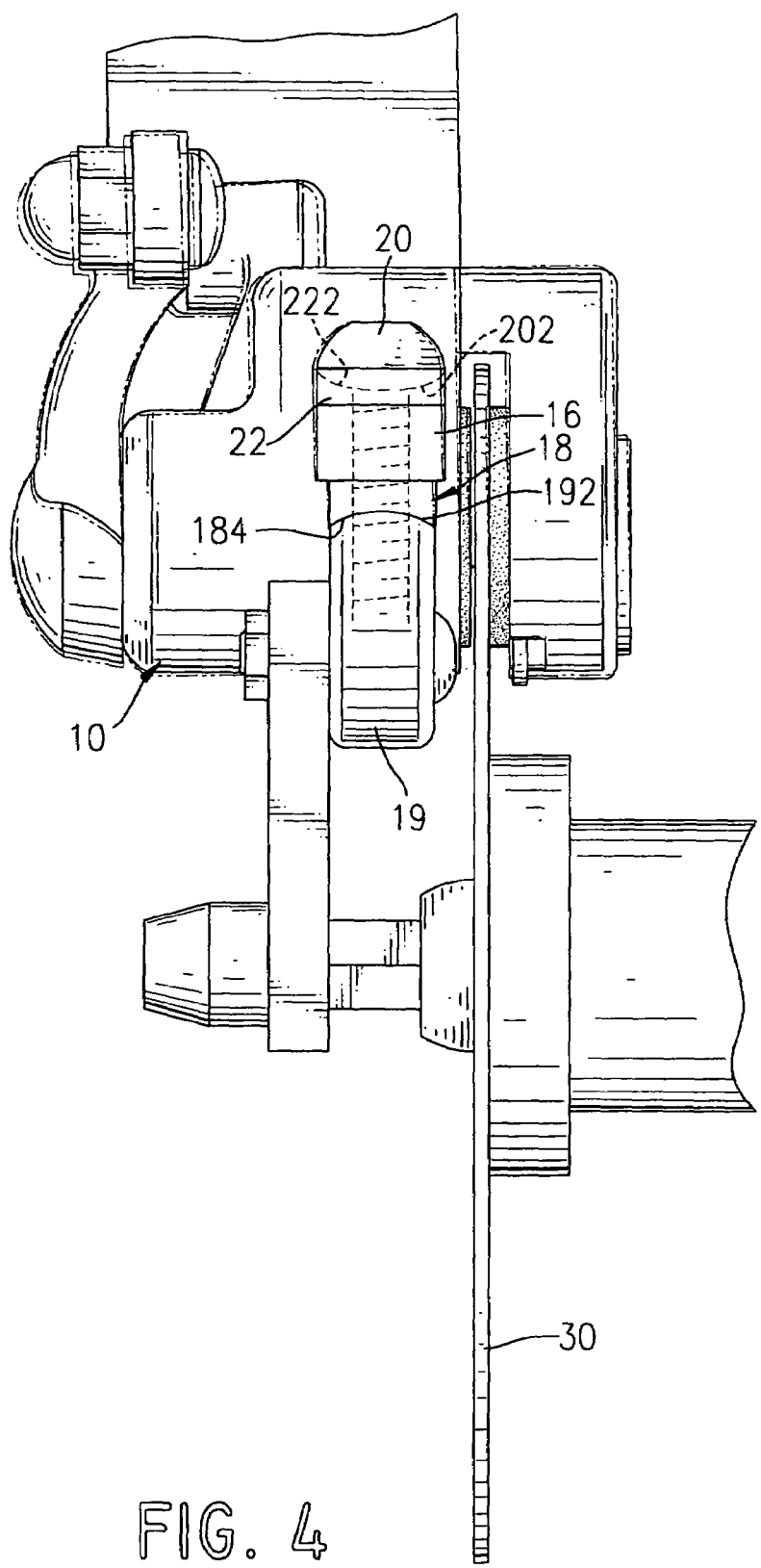
FIG. 4 is an operational side plan view of the brake assembly in FIG. 1 showing that the body of the brake disk is pivotally adjusted relative to a brake disk.
Figure 5:
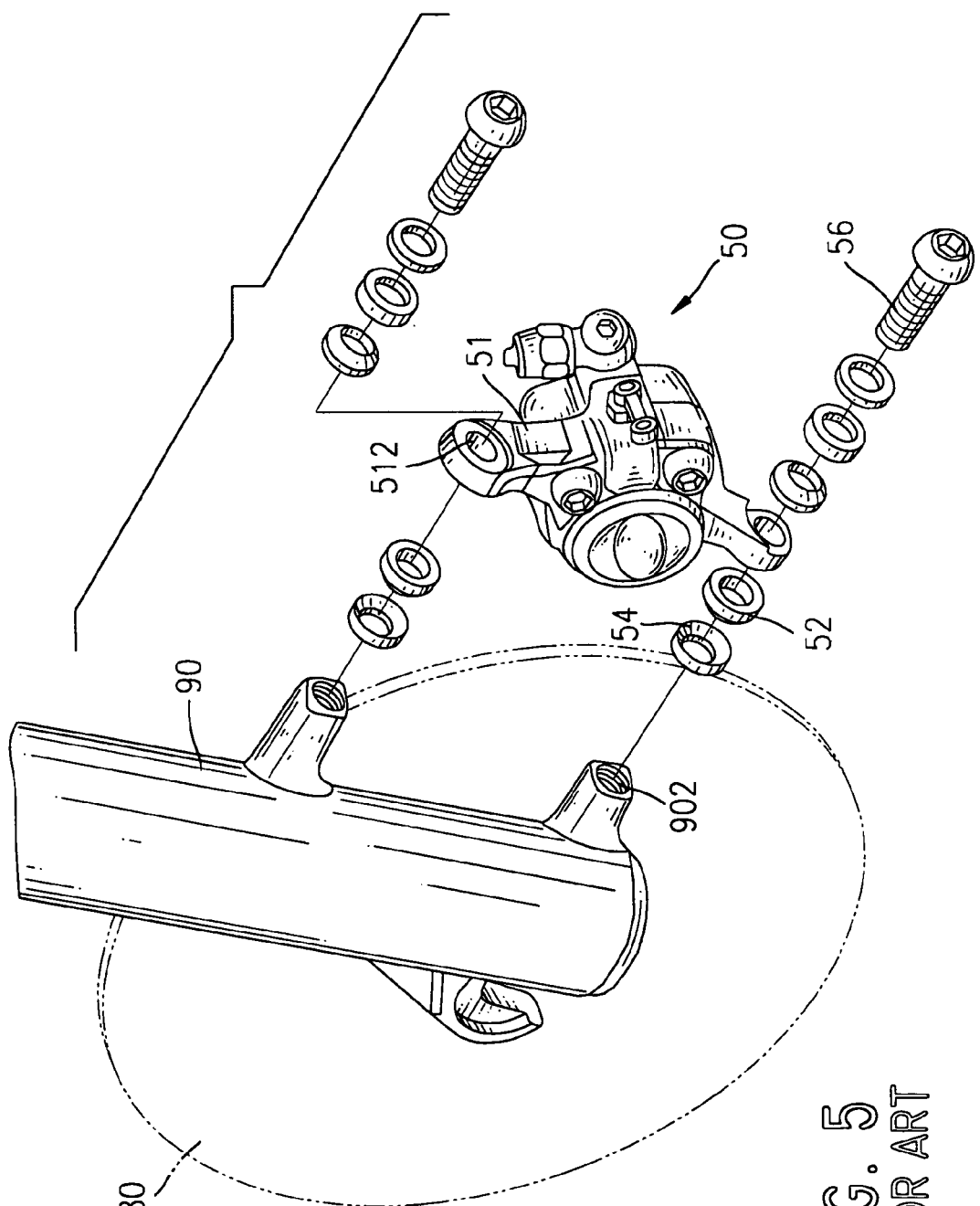
FIG. 5 is an exploded perspective view of a conventional disk brake assembly in accordance with the prior art.
Figure 6:
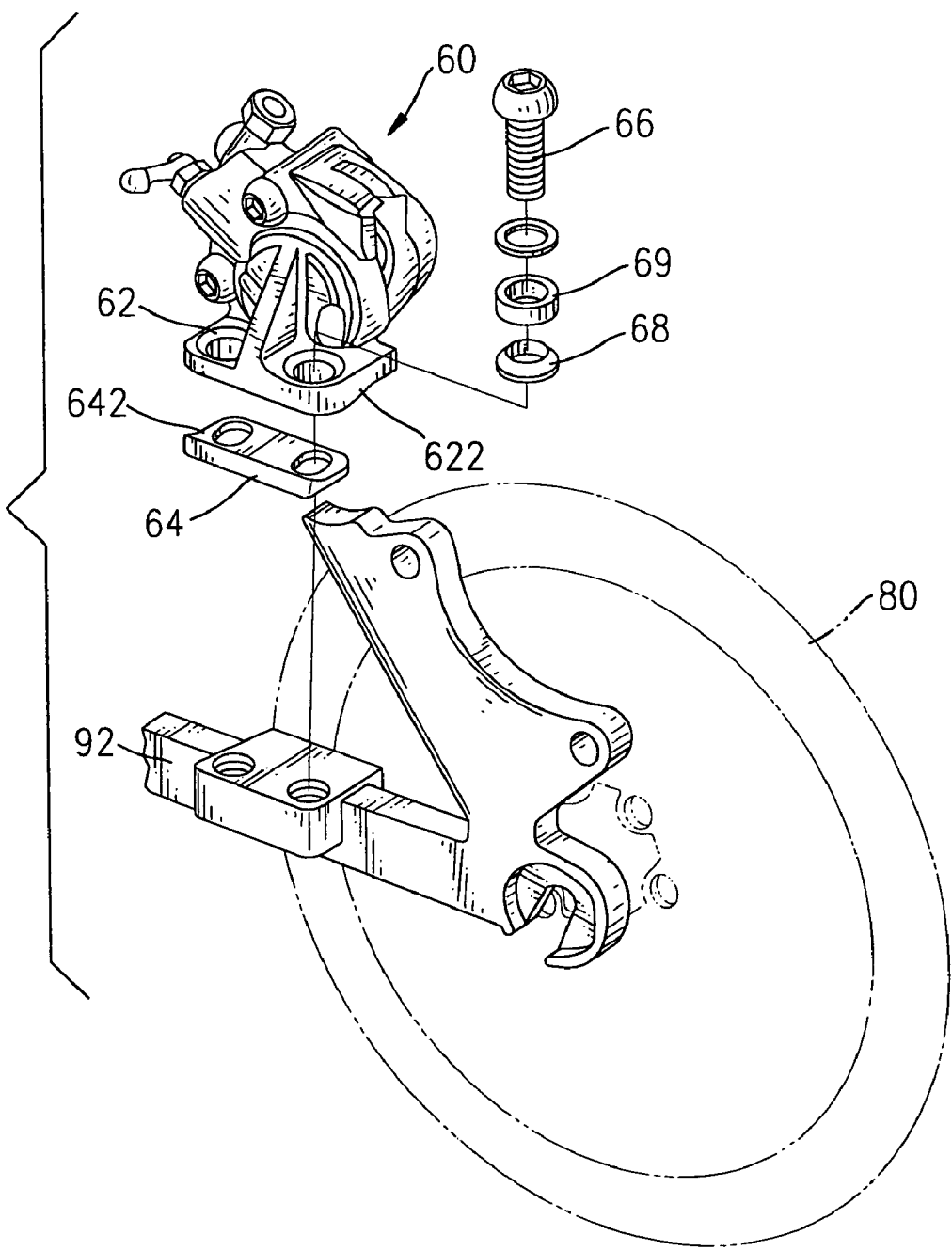
FIG. 6 is an exploded perspective view of another conventional disk brake assembly in accordance with the prior art.

With reference to FIGS. 3 and 4, when the bolts (20) are loosened, the body (10) can be laterally moved relative to the adjusting plates (18) along the elongated through holes (162) in the wings (16). Accordingly, the lateral position of the body (10) relative to the fork of the bicycle is adjusted. In addition, with the arrangement of the concave-convex configuration between the adjusting plates (18) and the connecting arm (19), the body (10) can be pivoted relative to the connecting arm (19), such that the angular position of the brake pads (14) relative to the brake disk is adjusted to precisely align the brake pads (14) with the brake disk (30).

In such an arrangement, the structure of the brake disk assembly is simplified, and to manufacture and to assemble the brake disk assembly are both convenient. Moreover, the body (10) can be connected to either a front fork or a rear fork of a bicycle with the connecting arm (19), such that the brake disk assembly can be conveniently applied to a front fork or a rear fork of a bicycle and is versatile in use.

In addition, the adjusting device further comprises two washers (22) mounted around the bolts (20). Each washer (22) has a concave surface (222). Each bolt (20) has a head with a convex bottom (202) corresponding to the concave surface (222) of a corresponding one of the washers (22). With the concave surfaces (222) in the washers (22) and the convex bottoms (202) of the bolt heads, the bolts (20) can be tightly screwed with the threaded holes (194) in the connecting arm (19) even when the body (10) is pivoted relative to the connecting arm (19) at a large angle.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A disk brake assembly for a bicycle comprising:
    a body with a slot;
    two brake pads operationally mounted inside the body and respectively at two sides of the slot; and
    an adjusting device mounted on the body and comprising
        two wings extending from the body and each having a through hole;
        two adjusting plates attached respectively to the wings and each having a passage aligning with the through hole in a corresponding one of the wings;
        a connecting arm mounted between the adjusting plates and having two threaded holes defined respectively in two ends of the connecting arm and two mounting holes defined through the connecting arm;
        two bolts extending respectively through the through holes in the wings and the passages in the corresponding adjusting plates and screwed respectively into the threaded holes in the connecting arm; and
        a concave-convex configuration formed between the wings, the adjusting plates and the ends of the connecting arm to make the body adjustably connectable with the connecting arm in a universal direction.

2. The disk brake assembly as claimed in claim 1, wherein the concave-convex configuration comprises two concave surfaces formed respectively in the adjusting plates and two convex surfaces formed respectively at the two ends of the connecting arm and corresponding respectively to the concave surfaces in the adjusting plates.

3. The disk brake assembly as claimed in claim 2, wherein the through hole in each wing is an elongated through hole.

4. The disk brake assembly as claimed in claim 3, wherein the adjusting device further comprises two washers mounted around the bolts;
    each washer has a concave surface; and
    each bolt has a head with a convex bottom corresponding to the concave surface of a corresponding one of the washers.

5. The disk brake assembly as claimed in claim 1, wherein the through hole in each wing is an elongated through hole.

6. The disk brake assembly as claimed in claim 5, wherein the adjusting device further comprises two washers mounted around the bolts;
   each washer has a concave surface; and
   each bolt has a head with a convex bottom corresponding to the concave surface of a corresponding one of the washers.

7. The disk brake assembly as claimed in claim 1, wherein the adjusting device further comprises two washers mounted around the bolts;
   each washer has a concave surface; and
   each bolt has a head with a convex bottom corresponding to the concave surface of a corresponding one of the washers.

\* \* \* \* \*